Dec. 27, 1927.
H. W. ELDRIDGE
MEASURING INSTRUMENT
Filed May 11 1927
1,654,164
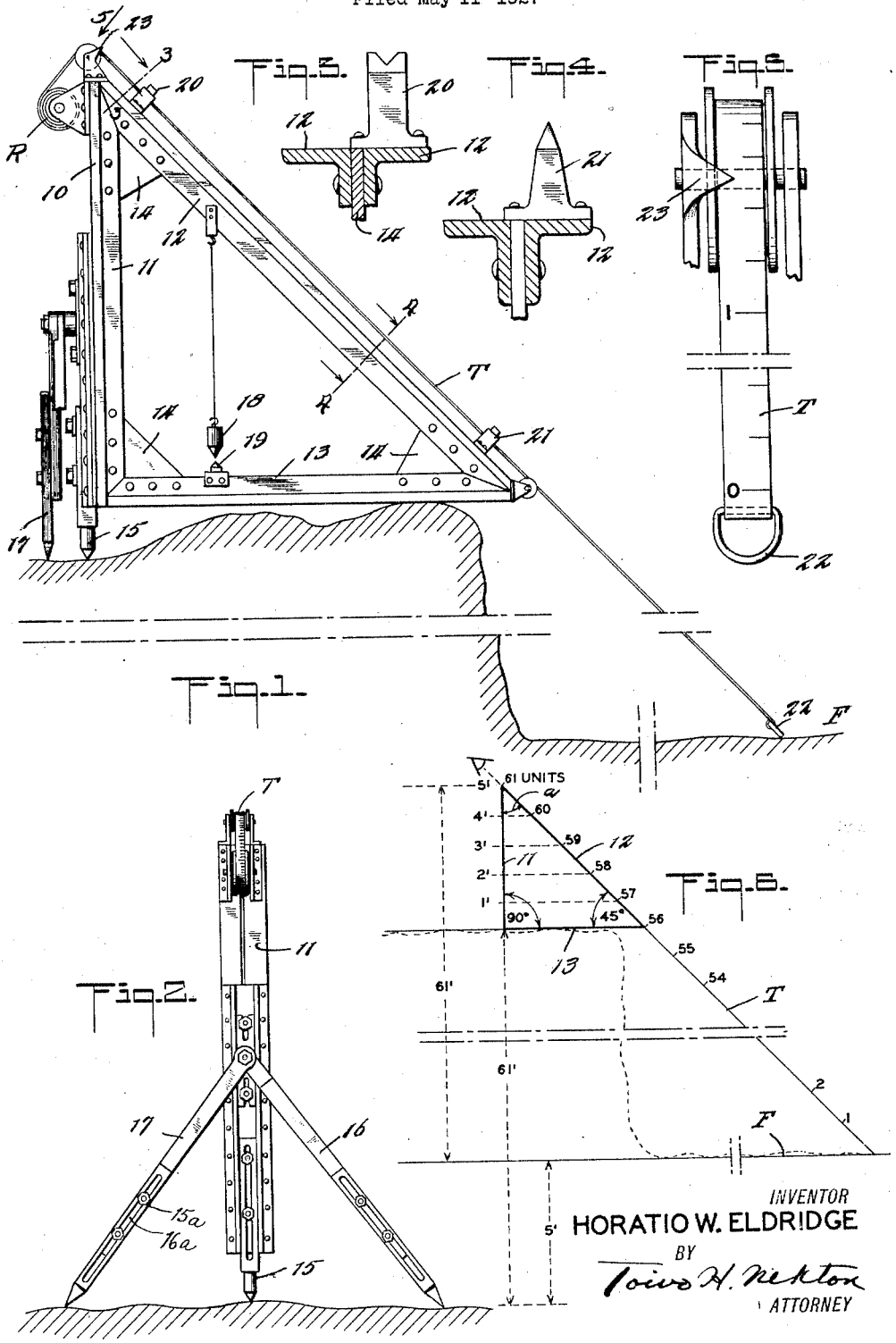
INVENTOR
HORATIO W. ELDRIDGE
BY
Toivo H. Nekton
ATTORNEY Patented Dec. 27, 1927.

1,654,164

UNITED STATES PATENT OFFICE.

HORATIO W. ELDRIDGE, OF NEW CITY, NEW YORK.

MEASURING INSTRUMENT.

Application filed May 11, 1927. Serial No. 190,542.

The present invention relates to measuring instruments and is more particularly directed toward the provision of an improved measuring instrument for gaging the depth for drilling the rock face of a quarry.

In rock quarrying, the rock is drilled to a short distance back of the quarry face to a suitable depth below the quarry floor. Where the quarry is deep, the accurate determination of the depth to be drilled has required a skilled surveyor and surveying instruments. In the absence of such accurate measurement, it has become customary, in order to be on the safe side, to carry the drilling much deeper than may be actually necessary.

The present invention contemplates a measuring apparatus of such a nature that the accurate determination of the depth to be drilled may be expeditiously determined by the quarrymen without computation or calculation. The measuring operation is carried out by a measuring apparatus which is kept on top of the quarry. It includes an instrument which may be adjusted to a predetermined position, and a measuring tape with which to measure the distance from the instrument to a point on the quarry floor determined by the observer after the instrument is adjusted. The observer uses sights carried by the instrument.

An object of the invention is to provide an improved measuring apparatus which may be used at the top of the rock face to determine the depth of the quarry.

The accompanying drawings show, for purposes of illustrating the invention, one of the many possible embodiments in which the invention may take form, it being understood that the drawings are illustrative of the invention rather than limiting the same.

In these drawings:

Figure 1 is a side elevational view of the measuring instrument showing it placed at the top of a quarry face and the measuring tape stretched down to the quarry floor;

Figure 2 is a rear elevational view of the instrument;

Figure 3 is a fragmentary sectional view taken on the line 3—3 of Figure 1, looking in the direction of the arrow and showing the upper sight;

Figure 4 is a similar view on the line 4—4 of Figure 1 showing the lower sight;

Figure 5 is a fragmentary elevational view taken in the direction of the arrow 5 of Figure 1; and Figure 6 is a diagrammatic view illustrating the taking of a measurement.

In the preferred form, the instrument takes the general shape of a triangle, and, as illustrated in the drawings, it is in the form of an isosceles right triangle. In order that it may be capable of standing the rough usage to which it is put, it is preferably made of strong, rigid, steel members. As shown in the drawings, the triangular frame 10 is made out of pairs of angle irons, indicated by the reference characters 11, 12 and 13, and held together by gusset plates 14.

In use, the lower side 13 of the triangular frame is placed on the top of the quarry where it is desired to conduct the next drilling operation. The lower front end of the frame projects slightly over the face of the rock. The rear upright member 11 of the frame is provided with a vertical leg 15 and with two oblique legs or braces 16 and 17. These legs may be adjusted by means of bolts 15ª passing through slots 16ª which are also adjustable. A plumb bob 18 is hung from the oblique side 12 of the triangular frame and is brought into register with a point 19 carried by the lower side 13 of the frame. Instead of a plumb bob, other leveling means may be used. It will thus be apparent that the frame 10 may be levelled and plumbed at the top of the quarry so that the frame has definite position.

The oblique or front side of the triangular frame carries sights such as indicated at 20 and 21 by means of which one can, after the frame has been plumbed and levelled, take accurate aim onto the floor F of the quarry. In practice, the observer at the top of the rock face of the quarry levels and plumbs the instrument and takes a sight down onto the quarry, signalling to a man on the quarry floor so that the man can locate the point in the quarry floor as indicated by the sights. This point is then marked, and a tape T carried on a reel R at the top of the frame is lowered down over the quarry face. The man down on the quarry floor then brings the lower end 22 of the tape down to the point indicated on the quarry floor while the instrument man takes a reading on the tape where it passes by a pointer 23 carried near the top of the frame. The observer thereby obtains a reading on the tape corresponding to the distance down to the determined point on the quarry floor.

In order to eliminate computations the tape T is graduated so as to read the vertical height of the top of the frame above the quarry floor. Instead of graduating the tape in feet and inches, the graduations are arbitrary depending upon the angle $a$ of the top of the instrument. The frame 10 is diagrammatically illustrated in Figure 6 and, for convenience, the vertical rear side 11 of the frame is made five feet high. When a 45° right triangle is used, the lower side 13 is also five feet long. When the frame is placed on top of the quarry face, plumbed, levelled and sighted down onto the quarry floor, the distance from the quarry floor along the tape to the top of the frame will be the hypotenuse of a right triangle whose vertical side equals the height of the top of the frame above the quarry floor. The tape T is graduated so as to read this height. In the showing illustrated in Figure 6, this reading of the tape will be 61 units, which will correspond with 61 feet elevation of the top of the frame above the quarry floor. As the height of the instrument is five feet, and as the drilling is generally carried five feet below the floor, it will be obvious that the distance to which one is to drill down from the top of the quarry face will also be 61 feet. This depth to drill will be read off directly from the tape. It will be unnecessary for quarrymen to make any computation.

While the drawing has illustrated the use of a frame whose angles are 45°, 45°, and 90°, it will of course be obvious that one can use a frame with different angles; for example, a frame wherein the angle $a$ at the top is 30° and the angle at the bottom 60°. In any case, the tape is preferably calibrated to read directly the height of the instrument above the quarry floor. This calibration will be according to the secant of the angle of sight relative to the vertical. The 60°, 30°, 90° triangle may be used when the quarry floor does not extend out enough to permit the use of the 45° triangle. Where a different height frame is used, or different length of hole below the quarry floor is desired, the tape may be especially calibrated.

From the foregoing, it will be apparent that the instrument may be kept at the top of the quarry face and may be set up by the quarrymen working on the top of the quarry. The tape is thrown down into the quarry, and after the determination has been made, it is wound up on the reel and the instrument moved to the next place in which to take an observation.

What is claimed is:

1. A depth measuring instrument for quarries and the like comprising a frame adapted to be placed at the top of the rock face of the quarry, said frame having sights, means for leveling and plumbing the frame to bring the sights to a predetermined angle to the vertical, whereby the frame may be sighted onto the quarry floor, and a measuring tape carried by the frame and adapted to be brought to the point on the quarry floor determined by the sights.

2. A depth measuring instrument for quarries and the like comprising a frame adapted to be placed at the top of the rock face of the quarry, said frame having sights, means for leveling and plumbing the frame to bring the sights to a predetermined angle to the vertical, whereby the frame may be sighted onto the quarry floor, and a measuring tape carried by the frame and adapted to be brought to the point on the quarry floor determined by the sights, said tape being calibrated according to the secant of the angle of sight relative to the vertical, whereby readings on the tape will indicate the height of the instrument above the quarry floor.

3. An instrument for determining the desired depth of drilling and to bring the drill to a predetermined distance below a quarry floor, said instrument consisting of a triangular frame provided with means for sighting from a point at a predetermined distance above the top of the rock face and at a predetermined angle relative to the vertical onto the quarry floor and carrying a reel near the top of the rear side of the frame, said frame having a roller mounted at the top thereof and said sighting means being provided with guide slots, and a calibrated measuring tape running from the reel over said roller and thence through said guide slots, which tape, when extended along the line of sight to a given point on the quarry floor, permits a direct reading, at the top of the frame, of the depth to be drilled.

4. A depth measuring instrument for quarries and the like, comprising a triangular frame adapted to be placed in a vertical plane at the top of the rock face of the quarry, a leveling indicator carried by the frame, an adjustable leg and adjustable braces for leveling and plumbing the frame, and sights carried by the oblique side of the frame, whereby the frame may be sighted onto the quarry floor.

5. A depth measuring instrument for quarries and the like, comprising a triangular frame adapted to be placed in a vertical plane at the top of the rock face of the quarry, a leveling indicator carried by the frame, an adjustable leg and adjustable braces for leveling and plumbing the frame, sights carried by the oblique side of the frame, whereby the frame may be sighted onto the quarry floor, and a measuring tape extending from the frame down to the point on the quarry floor determined by the sights.

6. A depth measuring instrument for quarries and the like, comprising a triangular frame adapted to be placed in a vertical plane at the top of the rock face of the quarry, a leveling indicator carried by the frame, an adjustable leg and adjustable braces for leveling and plumbing the frame, sights carried by the oblique side of the frame, whereby the frame may be sighted onto the quarry floor, and a measuring tape extending from the frame down to the point on the quarry floor determined by the sights, said tape being calibrated according to the secant of the angle of sight relative to the vertical whereby the readings of the tape will read the height of the instrument above the quarry floor.

7. A depth measuring instrument for quarries and the like, comprising a triangular frame adapted to be placed in a vertical plane at the top of the rock face of the quarry, a leveling indicator carried by the frame, an adjustable leg and adjustable braces for leveling and plumbing the frame, sights carried by the oblique side of the frame, whereby the frame may be sighted onto the quarry floor, and a measuring tape extending from the top of the frame down to the point on the quarry floor determined by the sights, said tape being calibrated according to the secant of the angle of sight relative to the vertical whereby the readings of the tape will read the height of the tape and will directly indicate the depth of drilling to bring the hole below the quarry floor a distance equal to the height of the back side of the frame.

8. A depth measuring instrument for quarries and the like, comprising a triangular frame adapted to be placed in a vertical plane at the top of the rock face of the quarry, a leveling indicator carried by the frame, an adjustable leg and adjustable braces for leveling and plumbing the frame, hinges connecting the sides of the frame and adjustable braces whereby the desired angles of the frame may be fixed, sights carried by the oblique side of the frame, whereby the frame may be sighted onto the quarry floor, and a measuring tape extending from the top of the frame down to the point on the quarry plane determined by the sights, said tape being calibrated according to the secant of the angle of sight relative to the vertical whereby the reading of the tape will give the height of the tape and will directly indicate the depth of drilling to bring the hole below the quarry floor and distance equal to the height of the back side of the frame.

HORATIO W. ELDRIDGE.